United States Patent [19]

Yoshiharu

[11] Patent Number: 4,755,369
[45] Date of Patent: Jul. 5, 1988

[54] PRODUCTION OF ULTRAFINE PARTICLES

[75] Inventor: Ozaki Yoshiharu, Musashino, Japan

[73] Assignee: Research Development Corporation of Japan, Tokyo, Japan

[21] Appl. No.: 839,495

[22] Filed: Mar. 13, 1986

[30] Foreign Application Priority Data

May 22, 1985 [JP] Japan .............................. 60-109788
May 22, 1985 [JP] Japan .............................. 60-109789

[51] Int. Cl.$^4$ .................... B22F 9/16; C01B 33/00; C01G 55/00
[52] U.S. Cl. ................................ 423/339; 423/592; 423/619; 75/0.5 A
[58] Field of Search ........ 420/462; 75/0.5 A, 0.5 AA, 75/0.5 AB, 0.5 AC; 423/592, 625, 619, 339, 89

[56] References Cited

U.S. PATENT DOCUMENTS 4,241,042 12/1980 Matijevic et al. .................... 423/610
4,636,248 1/1987 Ogata et al. ..................... 75/0.5 AA Primary Examiner—Christopher W. Brody
Attorney, Agent, or Firm—Armstrong, Nikaido, Marmelstein & Kubovcik

[57] ABSTRACT

There is provided a process for producing ultrafine particles by preparing one or more than one kind of alkoxide of a metal which is a component of the desired ultrafine particles, and subsequently hydrolyzing or heating said alkoxide. For the production of ultrafine particles of ruthenium oxide and/or metallic ruthenium, which are used as a raw material of thick film resistors, a ruthenium compound is reacted with an alkali metal alkoxide to give a ruthenium alkoxide and it is hydrolyzed or heated. For the production of a low-melting glass (including lead oxide), which is used as a sintering assistant or easy-to-sinter powder, at least three kinds of compounds (alkoxides or sols) including a lead alkoxide are reacted with one another and the resulting reaction product is hydrolyzed.

13 Claims, 10 Drawing Sheets

PRODUCTION OF ULTRAFINE PARTICLES

BACKGROUND OF THE INVENTION

1. Field of the Invention

The present invention relates to a process for producing ultrafine particles, and more particularly, it relates to a process for producing ultrafine particles of ceramics or metal without using the melting and pulverizing processes.

2. Description of the Prior Art

A remarkable progress has recently been made in the micromachining technology typified by the LSI (large scale integration) technology in electronics. The microforming and machining technology is necessary to produce extremely small components which are essential for the miniaturization of electronics machines and equipment with high performance and high reliability. Thus the development of this technology is urgently required. Such developmental works will be supported by the technology of producing ultrafine particles of ceramics or metal. For example, ultrafine particles permit the reduction of the thickness of the paste layer used as the thick film resistor which is one element on the circuit board of hybrid IC. The paste for this application is produced from a powder of ruthenium oxide or metallic ruthenium.

According to the conventional technology, ruthenium oxide is produced by heating ruthenium or ruthenium sulfide in an oxygen stream or oxidizing atmosphere, and metallic ruthenium is obtained by electrorefining. Ruthenium oxide produced by the dry method has to undergo a process for size reduction (below 1 $\mu$m) which consumes a great deal of time and energy. In addition, with the conventional pulverizing process it is difficult to produce ruthenium oxide powder of narrow particle size distribution and high purity. This is true of metallic ruthenium powders. In other words, there has been no process for producing a high-performance material for micromachining.

In the case of ceramics as an electronics material, it is necessary to sinter ultrafine particles of ruthenium oxide, ferrite, barium titanate, or the like so that the raw material powder does not lose its characteristic properties. This is accomplished by using a very active assistant which is as fine as the ceramics. To be more specific, a low-melting glass powder of ultrafine particles of about 100 A in size is favourably used as this kind of assistant. This glass powder is conventionally produced by mixing, melting and crushing a low-melting glass. Therefore, the conventional process requires a great deal of time and energy for melting oxides at high temperature and crushing glass. Moreover, the glass powder thus obtained is not good in particle properties.

SUMMARY OF THE INVENTION

It is an object of the present invention to provide a process for producing a ceramic powder and/or metal powder of ultrafine particles without using the melting and pulverizing steps, said powder being an electronics raw material or a sintering assistant.

It is another object of the invention to provide a process for producing ruthenium oxide powder and metallic ruthenium powder of high purity and ultrafine particles without using the melting and pulverizing steps.

It is another object of the invention to provide a process for producing a low-melting glass powder as a sintering assistant or easy-to-sinter powder which can be incorporated into a ceramic powder or metal powder of ultrafine particles without any adverse effect on the properties of the raw material.

The gist of the invention resides in a process for producing ultrafine particles which comprises the first step of preparing one or more than one kind of alkoxide of a metal which is a component of the desired ultrafine particles, and the second step of hydrolyzing said alkoxide to give precipitates and separating the precipitates, or the second step of heating said alkoxide.

According to the process of this invention, it is possible to obtain ultrafine particles in a short time with a small amount of energy by the liquid phase reaction, without using the melting and pulverizing steps.

One embodiment of this invention relates to a process for producing ruthenium oxide powder and metallic ruthenium powder by the steps of reacting a ruthenium compound with an alkali metal alkoxide and hydrolyzing the reaction product. According to this embodiment, it is possible to produce ultrafine particles of ruthenium oxide and/or metallic ruthenium having any desired purity.

Another embodiment of this invention relates to a process for producing a low-melting glass containing lead oxide by the steps of reacting at least three compounds including a lead alkoxide selected from alkoxides or sols derived from said alkoxides and hydrolyzing the reaction product. According to this embodiment, it is possible to produce an ultrafine glass powder of good particle properties (particle size, shape, and distribution) having a desired low melting point. The low-melting glass powder thus obtained is mixed with ceramic powder such as ruthenium oxide, ferrite and barium titanate to achieve sintering at low temperatures. If the low-melting glass powder is produced in the same vessel as used for producing ceramic powder by the hydrolysis of an alkoxide, the resulting hydrolyzate can be used as such for low-temperature sintering.

DETAILED DESCRIPTION OF THE INVENTION

According to one embodiment of this invention, ruthenium oxide powder and/or metallic ruthenium powder are obtained in the following manner.

The ruthenium compound as the starting material is a ruthenium halide such as ruthenium chloride. The alcohol to prepare an alkoxide is methanol, ethanol, propanol, butanol, and the like. The alkali metal to prepare an alkoxide is sodium, lithium, and potassium.

A ruthenium compound is reacted with an alkali metal alkoxide to give a ruthenium alkoxide, which is then hydrolyzed or thermally decomposed to give ruthenium oxide powder and/or metallic ruthenium powder. This powder is composed of ultrafine particles ranging from 100 to 200 A in size and has a narrow particle size distribution. This powder can be obtained by either hydrolysis or thermal decompositon.

The hydrolysis can be accomplished by adding decarbonated distilled water to the reaction product at 0° to 100° C., preferably 25° to 100° C., at which the alkoxide does not decompose and the reactants are easy to handle.

The thermal decomposition may be accomplished at any temperature from room temperature to 1000° C. In other words, the reaction product forms ruthenium oxide or metallic ruthenium at room temperature. Either ruthenium oxide or metallic ruthenium is obtained depending on the type of alcohol used and the heating temperature.

Since the reactions are performed in liquid phase, it is rather simple to raise the purity of the product by refining, for example, extracting the by-product with an organic solvent (such as alcohol and benzene).

According to another embodiment of this invention, a low-melting glass powder (including lead oxide powder) used as a sintering assistant or easy-to-sinter powder is obtained in the following manner.

(By "alkoxide" is meant a compound formed by replacing the hydrogen atom of the hydroxyl group of an alcohol by a metal element such as boron, aluminum, and silicon; and by "glass" is meant an amorphous solid of an inorganic compound.)

The starting materials in this embodiment are at least three kinds of alkoxides including a lead alkoxide and sols derived from the alkoxides. Alkoxides other than lead alkoxide include, for example, silicon alkoxide, boron alkoxide, and aluminum alkoxide; and the sols include silica sol derived from a silicon alkoxide and alumina sol derived from an aluminum alkoxide.

In this embodiment, the starting materials are a lead alkoxide and two or more other alkoxides selected from the above-mentioned alkoxides and sols derived from the alkoxides. Typical combinations are shown below, although other combinations are also possible.

(1) $Pb(OR)_2$, $B(OR)_3$, and $SiO_2$ sol derived from $Si(OR)_4$ (2) $Pb(OR)_2$, $B(OR)_3$, $Si(OR)_4$, and $Al(OR)_3$ (3) $Pb(OR)_2$, $B(OR)_3$, $Si(OR)_4$, and $Al_2O_3$ sol derived from $Al(OR)_3$ These alkoxides and sols are mixed and reacted with one another at a desired ratio. The mixing and reaction should preferably be performed in an organic solvent to facilitate mixing and promote reaction. In addition, the reaction product obtained in an organic solvent affords, upon hydrolysis, precipitates having the same composition as the reactants used. Suitable examples of the organic solvent include benzene, alcohol, toluene, and xylene, and the most suitable one is benzene because of its high solvency. The reaction temperature is not critical so long as it is lower than the decomposition temperature of alkoxides used. For the ease of operation, however, it should be 0° to 100° C., preferably from room temperature to 100° C.

The reaction product obtained in the above-mentioned step is then hydrolyzed. The hydrolysis is carried out by adding decarbonated distilled water directly to the reaction solution, or by bringing the reaction product into contact with steam spouting out of a pressurized vessel. The hydrolysis temperature is not critical. Where no pressure is applied, it is 0° to 100° C. preferably 25° to 100° C., at which the alkoxides used do not decompose. Where pressure is applied or steam is used, it is 100° to 200° C.

The hydrolysis forms powdery precipitates. The precipitates are separated from the mother liquor by centrifugation or filtration, followed by vacuum drying as required. In this way, there is obtained a low-melting glass powder.

The precipitates thus obtained are identified as low-melting glass by X-ray diffractometry, thermal analysis, and electron microscopic examination. The precipitates are amorphous regardless of the composition of the alkoxides used. In addition, no crystallization takes place when they are heated up to their melting point.

DETAILED DESCRIPTION OF THE EMBODIMENTS

The invention is now described in more detail with reference to the following examples.

EXAMPLE 1

Figure 1:
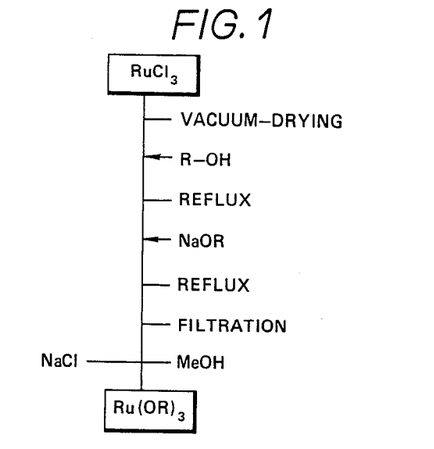
FIG. 1 shows the flowsheet of the process in Examples 1 and 2 of this invention.

Vacuum-dried, completely water-free ruthenium chloride, alcohol (methanol, ethanol, isopropanol, n-butanol, or t-butanol), and a stoichiometric amount of sodium alkoxide (methoxide, ethoxide, isopropoxide, n-butoxide, or t-butoxide) were heated and reacted with one another under reflux. There were obtained black reaction products which are solid at normal temperature and difficulty soluble in alcohol and benzene. The reaction products were washed with methanol to remove sodium chloride, a by-product, which is barely soluble or insoluble in alcohols other than methanol. The flowsheet of the above-mentioned steps is shown in FIG. 1.

Figure 2:
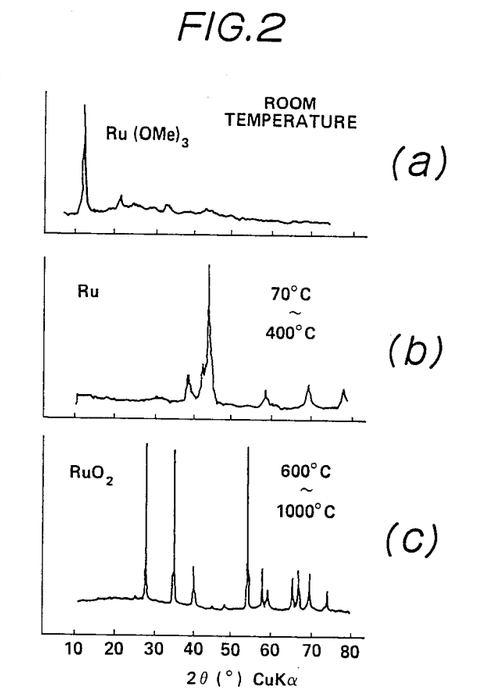
FIGS. 2(a) to 2(c) show the relation between the X-ray diffraction analysis and the heat treatment temperature observed in the powder obtained in Example 1.
Figure 3:
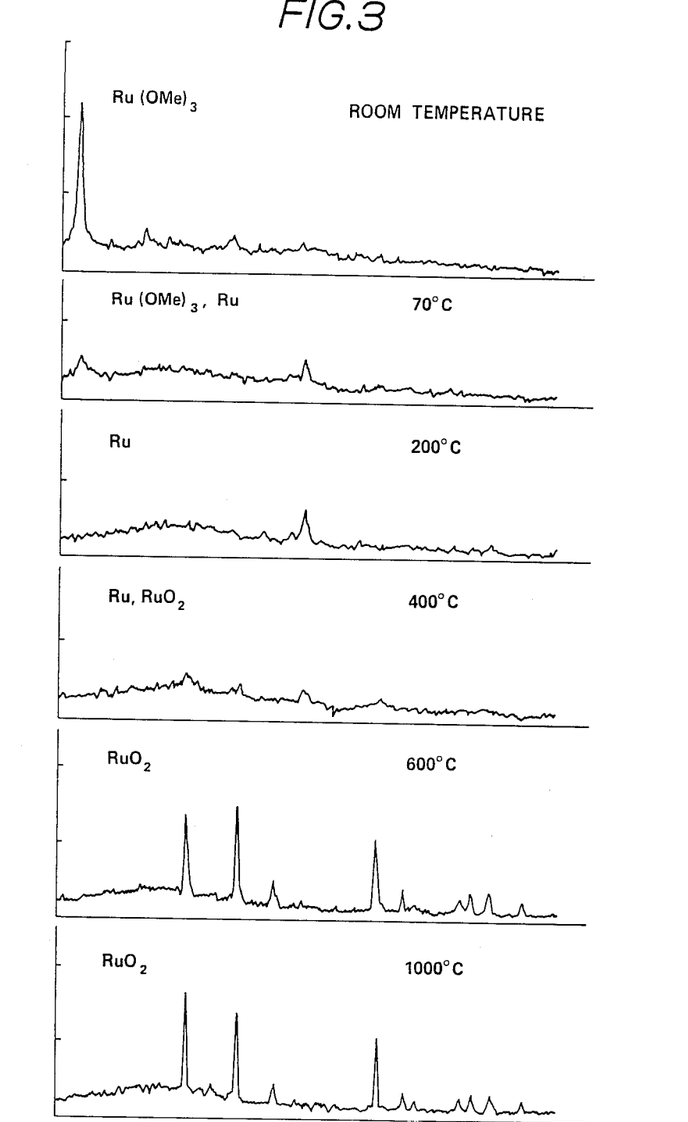
FIG. 3 shows X-ray diffraction patterns of the powder obtained in Example 2 that methanol is used as alcohol.
Figure 4:
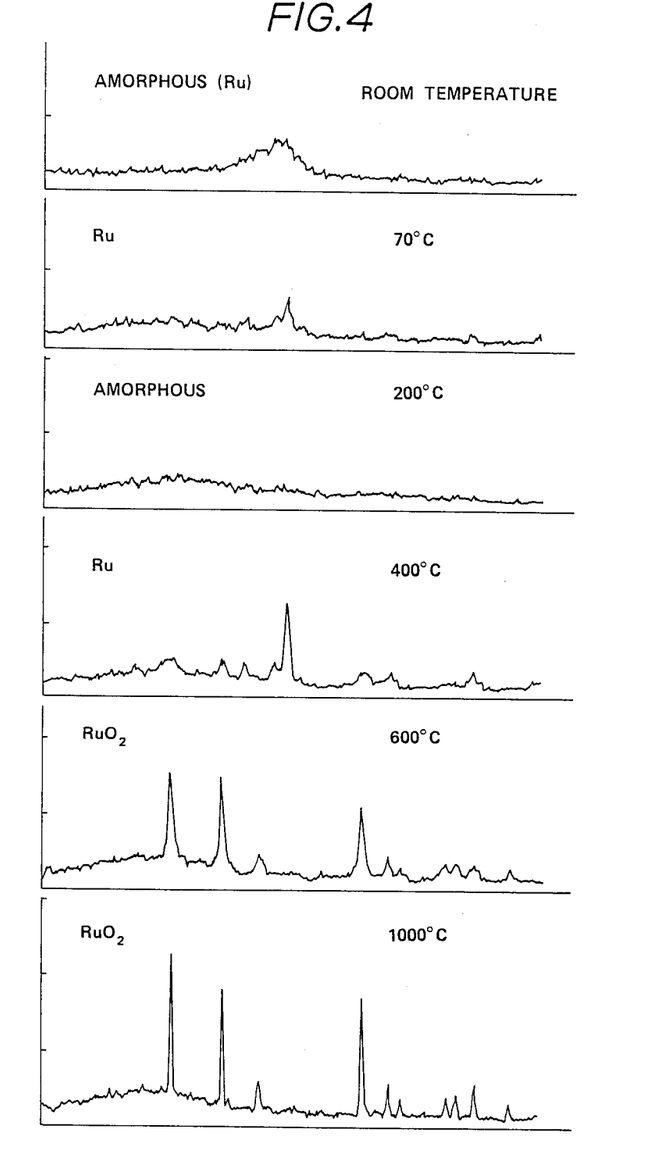
FIG. 4 shows X-ray diffraction patterns of the powder obtained in Example 2 that ethanol is used as alcohol.
Figure 5:
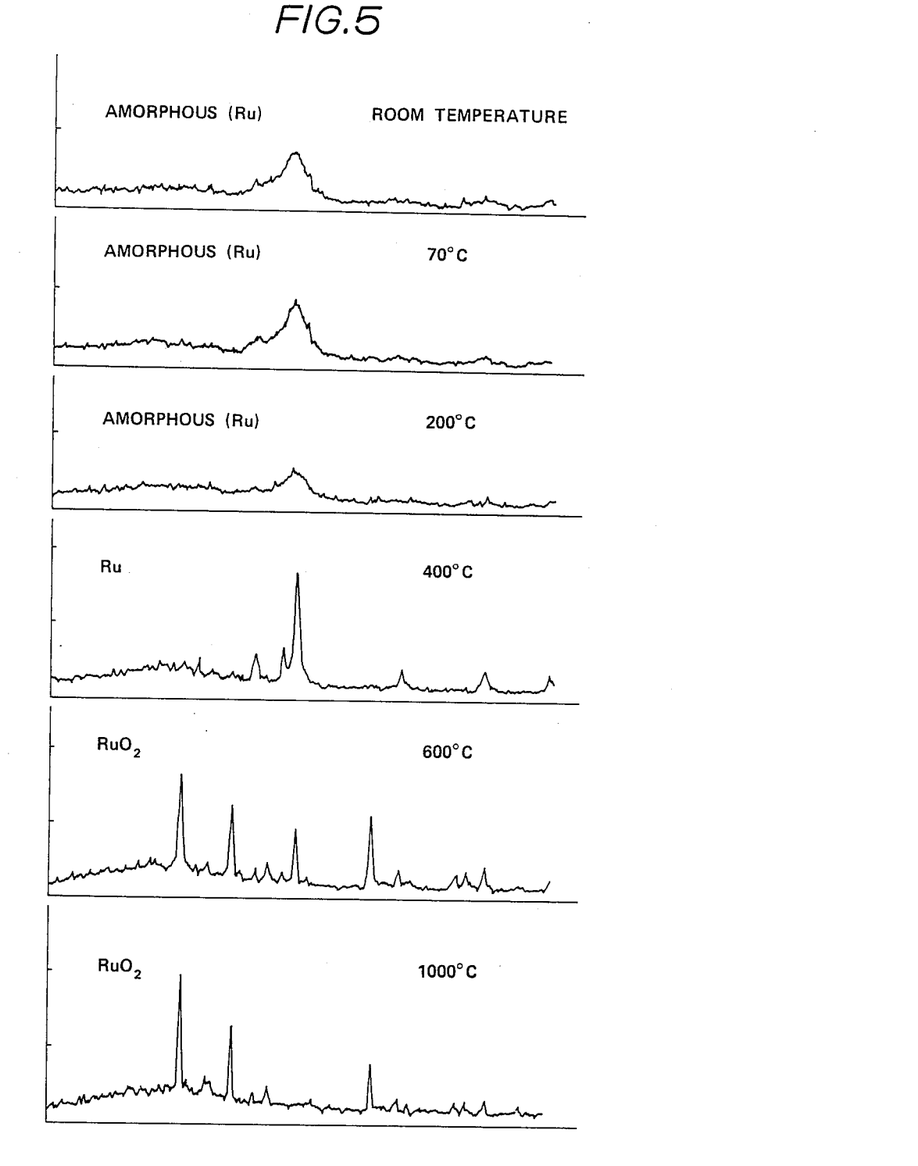
FIG. 5 shows X-ray diffraction patterns of the powder obtained in Example 2 that n-butanol is used as alcohol.
Figure 6:
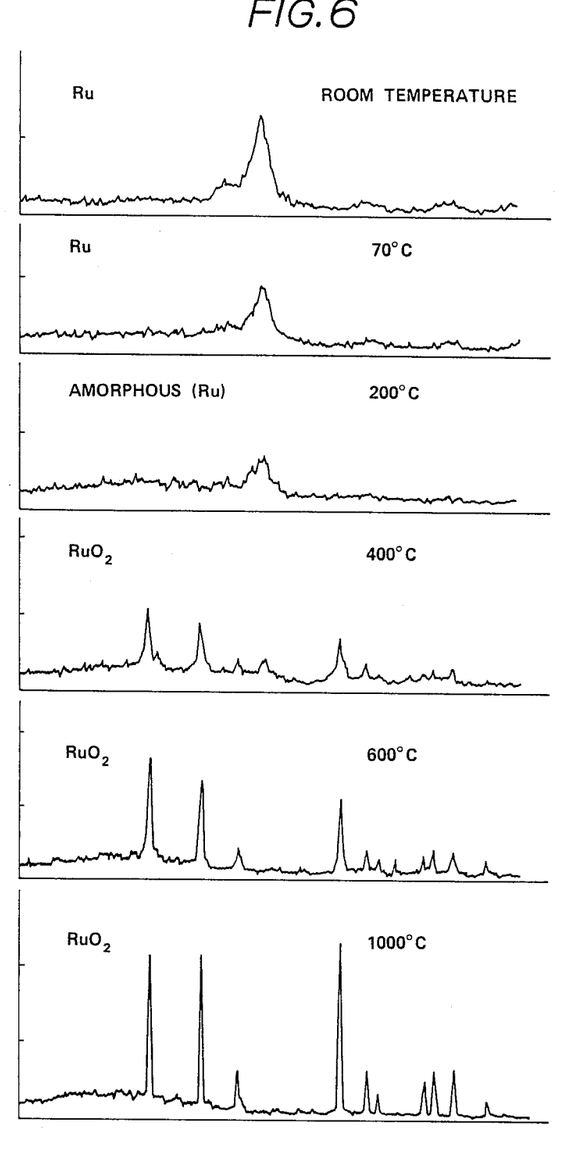
FIG. 6 shows X-ray diffraction patterns of the powder obtained in Example 2 that isopropanol is used as alcohol.
Figure 7:
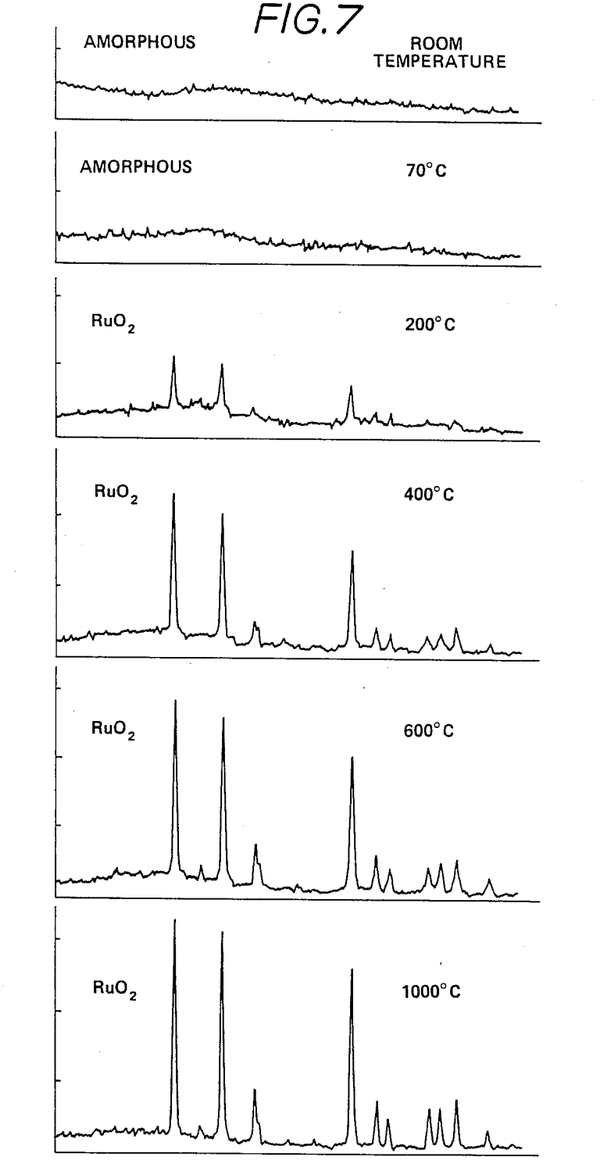
FIG. 7 shows X-ray diffraction patterns of the powder obtained in Example 2 that t-butanol is used as alcohol.

The resulting ruthenium alkoxide was dried at room temperature or 70° C., or heated at 200° C. or 600° C. in order to perform thermal decomposition. The resulting powders were examined by X-ray diffractometry and thermal analysis. The results of the X-ray diffractometry are shown in Table 1 and FIG. 2.

It is noted that metallic ruthenium is obtained in the case of heating up to 600° C. and ruthenium oxide is obtained in case of heating above 600° C.

TABLE 1

| Alcohol | Results of X-ray Diffractometry | | | |
|---|---|---|---|---|
| | Room Temp. | 70° C. | 200° C. | 600° C. |
| Methanol | Crystalline | Ru | Ru | $RuO_2$ |
| Ethanol | Amorphous | Amorphous | Ru | $RuO_2$ |
| Isopropanol | Ru | Ru | Amorphous (Ru) | $RuO_2$ |
| n-Butanol | Amorphous (Ru) | Amorphous (Ru) | Amorphous (Ru) | $RuO_2$ |
| t-Butanol | Amorphous | Amorphous | $RuO_2$ | $RuO_2$ |

EXAMPLE 2

Vacuum-dried, completely water-free ruthenium chloride, alcohol (methanol, ethanol, isopropanol, n-butanol, or t-butanol), and a stoichiometric amount of sodium alkoxide (methoxide, ethoxide, isopropoxide, n-butoxide, or t-butoxide) were heated and reacted with one another under reflux. There were obtained black reaction products which are solid at normal temperature and difficulty soluble in alcohol and benzene. The reaction products were washed with water to remove sodium chloride, a by-product.

The flowsheet of the above-mentioned steps is shown in FIG. 1.

Figure 8:
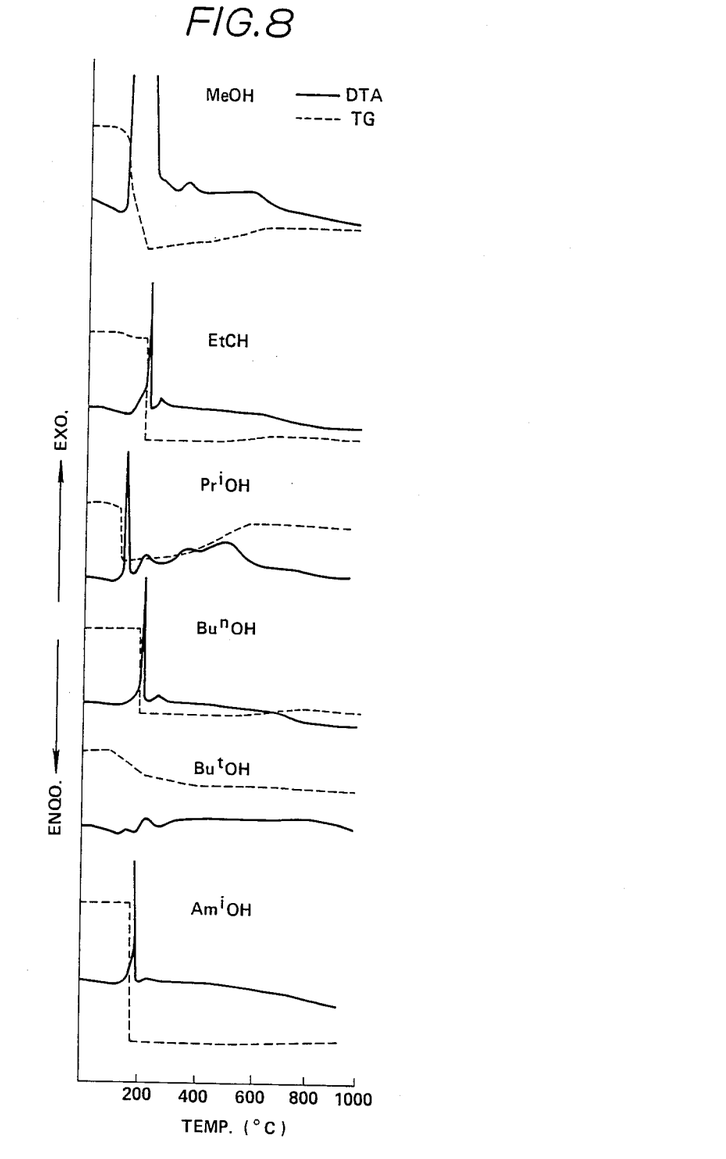
FIG. 8 shows the result of thermal analysis of the powder obtained in Example 2.

The resulting precipitates were dried at room temperature, and further dried at 70° C. or heat treated at 200° C., 400° C. and 600° C., respectively. The resulting powders were examined by X-ray diffractometry and thermal analysis. The results of the X-ray diffractometry are shown in Table 2 and FIG. 3 to FIG. 7, and the results of the thermal analysis are shown in FIG. 8.

TABLE 2

| $Ru(OR)_3$ | Result of X-ray Diffractometry | | | | |
|---|---|---|---|---|---|
| | Room Temp. | 70° C. | 200° C. | 400° C. | 600–1000° C. |
| $Ru(OMe)_3$ | $Ru(OMe)_3$ | $Ru(OMe)_3$ Ru | Ru | Ru $RuO_2$ | $RuO_2$ |
| $Ru(OEt)_3$ | Amorphous (Ru) | Ru | Amorphous | Ru | $RuO_2$ |
| $Ru(OPr^i)_3$ | Ru | Ru | Amorphous (Ru) | $RuO_2$ | $RuO_2$ |
| $Ru(OBu^n)_3$ | Amorphous (Ru) | Amorphous (Ru) | Amorphous (Ru) | Ru | $RuO_2$ |
| $Ru(Bu^t)_3$ | Amorphous | Amorphous | $RuO_2$ | $RuO_2$ | $RuO_2$ |
| $Ru(OAm^i)_3$ | Amorphous (Ru) | Amorphous | Amorphous (Ru) | Ru | $RuO_2$ |

According to the results of X-ray diffractometry and thermal analysis, the resulting powders obtained by using ethanol, isopropanol and n-butanol are metallic ruthenium, and the resulting powders obtained by using t-butanol are ruthenium oxide. They all afforded ruthenium oxide upon calcining.

EXAMPLE 3

Figure 9:
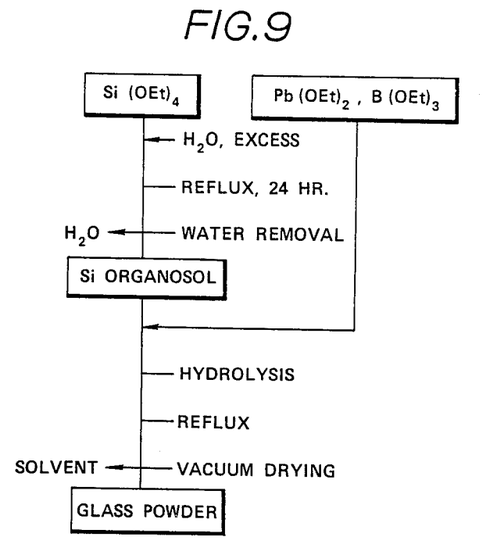
FIG. 9 shows the flowsheet of the process in Example 3 of this invention.

Experiments were carried out according to the flowsheet shown in FIG. 9. At first, silicon ethoxide Si(OEt)$_4$ was hydrolyzed under reflux to give a silica hydrosol. The hydrosol was converted into an organosol by replacing the aqueous medium with xylene by azeotropic distillation. The organosol was mixed with lead ethoxide Pb(OEt)$_2$ and boron ethoxide B(OEt)$_2$ at varied ratios. They were reacted with one another under reflux at 80° C. in benzene. The reaction product was hydrolyzed by adding dropwise decarbonated distilled water at 80° C. There were obtained powdery precipitates. The precipiates were centrifugally separated and washed, followed by vacuum drying at 70° C. for 12 hours.

The resulting powders were heated at 100° C. to 1000° C. to see if crystallization takes place before they melt. Crystallization was examined by X-ray diffractometry and the melting point was measured by thermal analysis. FIGS. 10(a) and 10(b) show the results, the former indicating the temperaure at which melting starts and the latter indicating the temperature at which complete vitrification takes place.

According to the results of X-ray diffractometry and thermal analysis, the products in this example were identified as amorphous solids having a composition of PbO-SiO$_2$-B$_2$O$_3$ regardless of the composition of the starting materials. They did not crystallize when heated up to their respective melting points. It is noted from FIG. 10 that the greater the amount of SiO$_2$, the higher the melting point, and the greater the amount of PbO, the lower the melting point. The melting point is further lowered when the composition contains B$_2$O$_3$.

Figure 10:
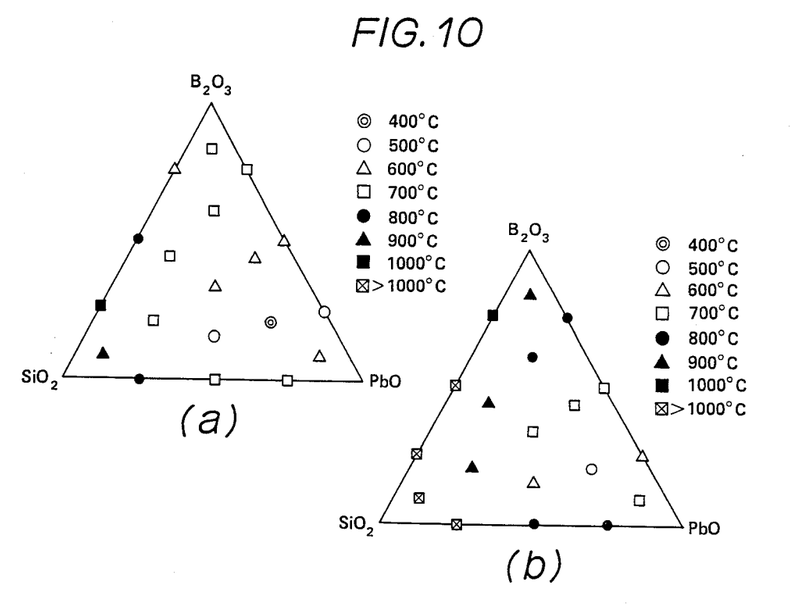
FIG. 10 shows the vitrification of a three-component compound of $PbO-B_2O_3-SiO_2$.

Those products having the molar ratios marked with ⊙, ○, △, □, ●, ▲, and ■, shown in FIG. 10(a) began to melt at 400° C., 500° C., 600° C., 700° C., 800° C., 900° C. and 1000° C., respectively. Those products having the molar ratios marked with ○, △, □, ●, ▲, and ■, shown in FIG. 10 (b) began to melt at 500° C., 600° C., 700° C., 800° C., 900° C., and 1000° C., respectively. The mark ⊠ indicates a composition that does not vitrify at 1000° C. or above. The composition Pb/B/Si (3/1/1 by mole) formed a good glass at the lowest temperature of 500° C.

EXAMPLE 4

Figure 11:
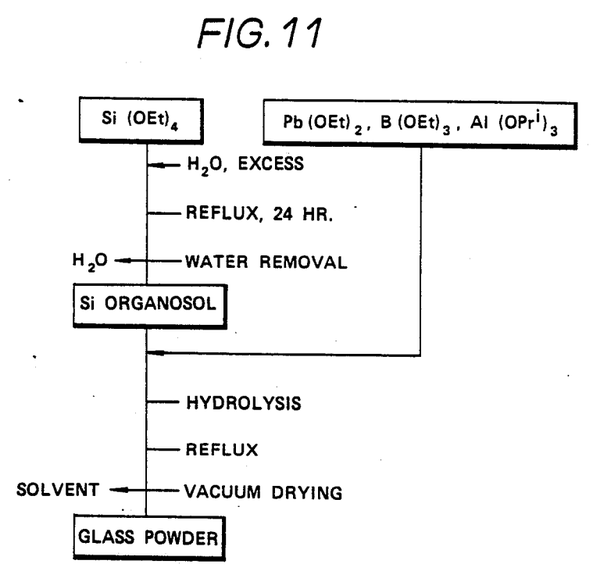
FIG. 11 shows the flowsheet of the process in Example 4 of this invention.

Experiments were carried out according to the flowsheet shown in FIG. 11. At first, silicon ethoxide Si(OEt)$_4$ was hydrolyzed under reflux to give a silica hydrosol. The hydrosol was converted into an organosol by replacing the aqueous medium with xylene by azeotropic distillation. The organosol was mixed with lead ethoxide Pb(OEt)$_2$ and boron ethoxide B(OEt)$_3$ to give a composition of Pb-B-Si (3/1/1 by mole) that vitrifies at the lowest temperature. Aluminum isopropoxide Al(Oi-Pr)$_3$ was added in an amount corresponding to 0.43 or 1.67 mol of Al. They were reacted with one another under reflux at 80° C. in benzene. The reaction product was hydrolyzed by adding dropwise decarbonated distilled water at 80° C. There were obtained powdery precipitates. The precipitates were centrifugally separated and washed, followed by vacuum drying at 70° C. for 12 hours.

Figure 12:
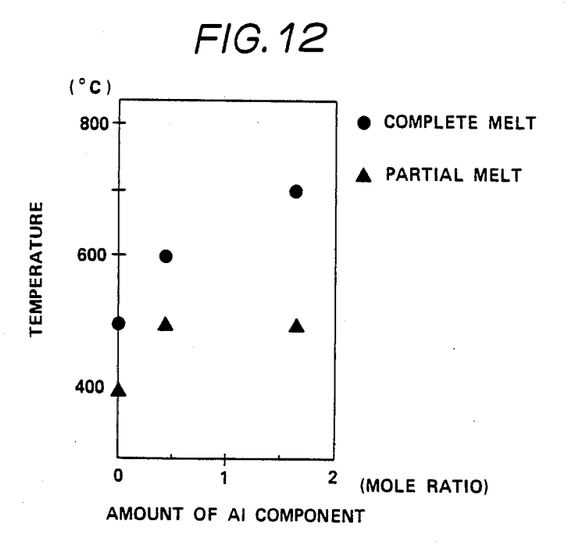
FIG. 12 shows the relationship between the melting point and the amount of Al in a glass composed of Pb/B/Si (3/1/1 by mole).

The resulting powders were heated at 100° C. to 1000° C. to see if crystallization takes place before they melt. Crystallization was examined by X-ray diffractometry and the melting point was measured by thermal analysis. FIG. 12 shows the relationship between the amount of Al and the vitrification temperature. It is noted that as the amount of Al increases, the vitrification temperature also rises. All of the powders obtained were amorphous according to X-ray diffractometry.

EXAMPLE 5

Figure 13:
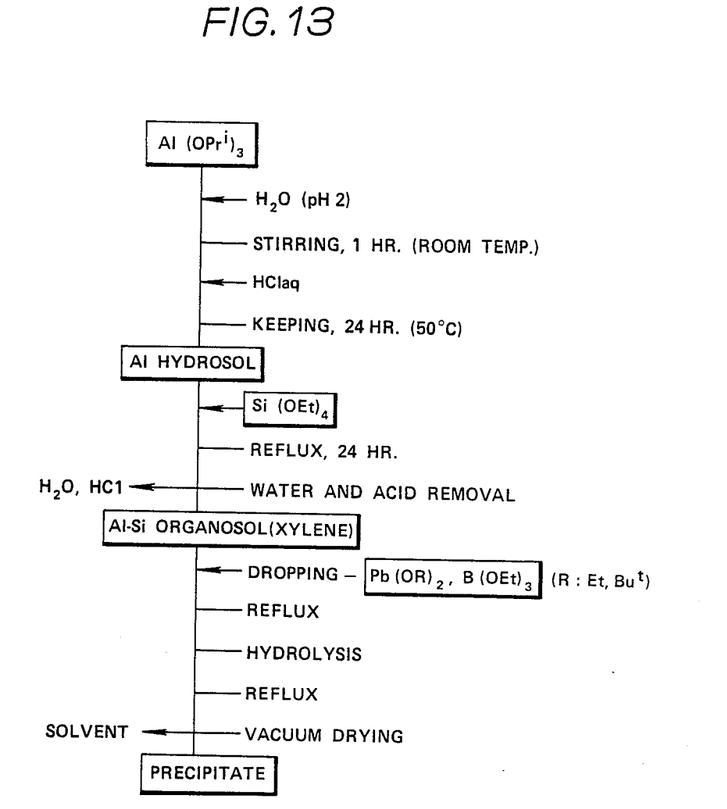
FIG. 13 shows the flowsheet of the process in Example 5 of this invention.

Experiments were carried out according to the flowsheet shown in FIG. 13. At first, aluminum isopropoxide Al(Oi-Pr)$_3$ was hydrolyzed with hydrochloric acid of pH 2, and the resulting product was deflocculated by further adding hydrochloric acid to give an alumina sol. The alumina sol was converted into alumina-silica hydrosol by adding silicon ethoxide under reflux. The hydrosol was converted into alumina-silica organosol by replacing the aqueous medium with xylene by azeotropic distillation. The organosol was mixed with lead ethoxide and boron ethoxide to give a composition of Pb-B-Si-Al (55/9.9/30/5.1 by wt %). They were reacted with one another under reflux at 80° C. in benzene. The reaction product was hydrolyzed by adding dropwise decarbonated distilled water at 80° C. There were obtained powdery precipitates. The precipitates were centrifugally separated and washed, followed by vacuum drying at 70° C. for 12 hours.

The resulting powders were heated at 100° C. to 1000° C. to see if crystallization takes place before they melt. They turned into a uniform clear glass at 800° C.

What is claimed is:

1. A process for producing sinterable ultrafine particles of ruthenium oxide and metallic ruthenium comprising: mixing and reacting a ruthenium halide with an alkoxide of an alkali metal by refluxing to give a ruthenium alkoxide; hydrolyzing the ruthenium alkoxide to give precipitates of ultrafine particles; and separating said precipitates to give ultrafine particles of ruthenium oxide and metallic ruthenium.

2. A process as claimed in claim 1, which further comprises separating, washing and calcining the precipitates of ultrafine particles obtained by hydrolyzing the ruthenium alkoxide to obtain ruthenium oxide.

3. A process as claimed in claim 1, wherein the hydrolysis in the second step is performed at 0° to 100° C. by adding distilled water.

4. A process as claimed in claim 1, wherein the hydrolysis in the second step is performed at 25° to 100° C.

5. A process as claimed in claim 1, wherein the hydrlysis in the second step is performed by contacting with a steam stream spouting out of a pressurized vessel.

6. A process for producing ultrafine particles of ruthenium oxide and metallic ruthenium comprising mixing and reacting a ruthenium halide with an alkoxide of *an alkali metal by refluxing to give a ruthenium alkoxide;* and thermally decomposing the ruthenium alkoxide to give ultrafine particles of ruthenium oxide and metallic ruthenium.

7. A process as claimed in claim 6, wherein the thermal decomposition is performed at room temperature to 1000° C.

8. A process as claimed in claim 7, wherein the thermal decomposition is performed at room temperature to 600° C. to give ultra fine particles of ruthenium oxide and metallic ruthenium.

9. A process as claimed in claim 7, wherein the thermal decomposition is performed at 600° C. and above to give ultra fine particles of ruthenium oxide.

10. A process for producing ultrafine particles of a low-melting glass powder containing lead oxide and silicon dioxide comprising:
   mixing and reacting a lead alkoxide and at least one compound selected from the group consisting of silicon alkoxides and silica sols derived therefrom with at least one selected from the group consisting of boron alkoxides, aluminum alkoxides and alumina sols derived therefrom;
   hydrolyzing said products obtained by said reaction to give precipitates of ultrafine particles;
   and separating said precipitates to give ultrafine particles of a low-melting glass powder containing lead oxide and silicon dioxide.

11. A process as claimed in claim 10, wherein the hydrolysis in the second step is performed at 0° to 100° C. by adding distilled water.

12. A process as claimed in claim 10, wherein the hydrolysis in the second step is performed at 25° to 100° C.

13. A process as claimed in claim 10, wherein the hydrolysis in the second step is performed by contacting with a steam stream spouting out of a pressurized vessel.

* * * * *